(12) United States Patent
Navarro

(10) Patent No.: US 8,672,079 B1
(45) Date of Patent: Mar. 18, 2014

(54) ANTI-THEFT GUARD FOR AUTOMOBILE COMPONENT

(76) Inventor: Rafael Navarro, Miami, FL (US)

( * ) Notice: Subject to any disclaimer, the term of this patent is extended or adjusted under 35 U.S.C. 154(b) by 379 days.

(21) Appl. No.: 12/982,860

(22) Filed: Dec. 30, 2010

Related U.S. Application Data

(60) Provisional application No. 61/291,531, filed on Dec. 31, 2009.

(51) Int. Cl.
*B60R 25/00* (2013.01)
*B60R 25/04* (2013.01)
*B65D 55/14* (2006.01)

(52) U.S. Cl.
USPC ............................... 180/287; 180/289; 70/166

(58) Field of Classification Search
USPC ................ 180/287, 289; 70/54, 56, 158–163, 70/166–169, 177–179, 246, 416; 123/198 F
See application file for complete search history.

(56) References Cited

U.S. PATENT DOCUMENTS

| | | | |
|---|---|---|---|
| 3,624,602 A * | 11/1971 | Le Doux | 307/10.4 |
| 3,987,408 A * | 10/1976 | Sassover et al. | 307/10.5 |
| 4,875,350 A * | 10/1989 | Faust | 70/241 |
| 4,913,254 A * | 4/1990 | Castro et al. | 180/287 |
| 5,408,211 A * | 4/1995 | Hall | 340/426.12 |
| 5,610,446 A * | 3/1997 | Garber | 307/10.5 |
| 5,638,044 A * | 6/1997 | Chua | 340/426.12 |
| 5,826,448 A * | 10/1998 | Graham | 70/209 |
| 7,044,148 B2 * | 5/2006 | Berger et al. | 137/15.08 |
| 7,819,219 B2 * | 10/2010 | Lang | 180/289 |
| 8,438,884 B1 * | 5/2013 | Bertrand | 70/54 |
| 2004/0183376 A1 * | 9/2004 | Tarbert | 307/10.3 |
| 2005/0144991 A1 * | 7/2005 | Bravo et al. | 70/56 |
| 2008/0173494 A1 * | 7/2008 | Lang | 180/289 |
| 2010/0186531 A1 * | 7/2010 | Miyagawa et al. | 74/473.24 |

* cited by examiner

*Primary Examiner* — Paul N Dickson
*Assistant Examiner* — Joselynn Y Sliteris
(74) *Attorney, Agent, or Firm* — H. John Rizvi; Gold & Rizvi, P.A.

(57) ABSTRACT

An anti-theft guard for a vehicle component includes a housing adapted to substantially enclose a vehicle component which is to be protected from theft and an attachment mechanism carried by the housing and adapted for attachment to a structural element of the vehicle. The anti-theft guard is forming including a cavity for covering/receiving the vehicle component. The guard includes a plurality of mounting wings extending outward from an edge formed about a periphery of the cavity, wherein the mounting wings are provided to secure the anti-theft guard to the structural element of the vehicle. A suggested application of the anti-theft guard is a cover placed over an electronic control module of a diesel engine.

20 Claims, 3 Drawing Sheets

ANTI-THEFT GUARD FOR AUTOMOBILE COMPONENT

This Non-Provisional Utility application claims the benefit of U.S. Provisional Patent Application Ser. No. 61/291,531, filed on Dec. 31, 2009, which is incorporated herein in its entirety.

BACKGROUND OF THE INVENTION

1. Field of the Invention

The present invention relates generally to an anti-theft device to protect components of an automobile such as components of an automobile engine from theft. More particularly, the present invention is directed to an anti-theft guard that is suitable for preventing theft of an automobile component such as an electronic control module of a diesel engine, for example and without limitation.

2. Description of the Prior Art

In the United States, more than a million automobiles are subjected to auto theft each year. From smaller cars to luxury vehicles to larger jeeps and trucks, car thieves prey on any type of vehicle that is insufficiently protected from theft. While a common misconception is that smaller sedans are the main targets of car thieves, stolen trucks account for 3 of the top 10 most stolen vehicles in the U.S. each year.

As is typically the case with smaller vehicles, the alarming number of stolen trucks recorded every year is typically due to a lack of effective theft prevention devices on the trucks. Unfortunately, professional car thieves may be easily able to bypass traditional car alarm systems and get away with their sought-after prizes. Well-trained professionals know the ins and outs of existing car anti-theft devices and can frequently circumvent these devices.

There are several anti-theft systems in the prior art. For example, the LoJack Corporation of Westwood, Mass. offers a Vehicle Theft Recovery System, which facilitates apprehension of a stolen vehicle. Immediately after theft of the vehicle is reported, a routine entry of vehicle information into the police computer system activates equipment that is well hidden on the vehicle. The activated equipment emits a signal which authorities are able to track in order to locate the stolen vehicle.

The OnStar Corporation of Detroit, Mich. also offers an anti-theft system, which is capable of pinpointing the location of a stolen vehicle and then working directly with police to facilitate recovery of the vehicle using exclusive technologies known as Stolen Vehicle Slowdown and Remote Ignition Block. The Remote Ignition Block technology transmits a remote ignition block signal that turns off and prevents restarting of the stolen vehicle's engine. If the vehicle is moving and conditions are safe, authorities trailing the vehicle can request implementation of the Stolen Vehicle Slowdown technology, in which case OnStar transmits a remote signal that gradually slows the vehicle to a stop.

While effective for recovering a stolen vehicle, these systems are not suitable for deterring or preventing theft of individual vehicle components such as the electronic control module of a diesel engine, for example and without limitation.

Conventional vehicle alarm systems typically emit an audible alarm in the event that a window or door on the vehicle is opened when the system is armed. Therefore, conventional vehicle alarm systems are typically limited to protecting valuables inside a vehicle such as a vehicle audio system. However, conventional vehicle alarm systems do not trigger an alarm in the event that theft of an individual component of the vehicle, such as a component of the vehicle engine, is attempted.

Engines of modern vehicles such as diesel trucks include a small computer by which some or all of the operational variables of the vehicle engine are controlled. This computer, commonly known as an "electronic control module" (ECM), is a very valuable piece of equipment the value of which may exceed one thousand dollars. In the event that the ECM of a vehicle is stolen, installation of a replacement ECM may cost as much as $4,000 in some instances. Moreover, because the ECM controls some or all of the operational variables of the engine, under circumstances in which the ECM is stolen at some point during transit of the vehicle to a destination, the engine is incapable of continued operation. Therefore, the vehicle cannot continue to its destination unless and until a replacement ECM is located, transported to the incapacitated vehicle and installed. The resulting travel delays may result in considerable expense, particularly in the event that the incapacitated vehicle is a truck that carries perishable freight that is ruined due to the travel delays.

Therefore, an anti-theft device that is suitable for deterring theft of a vehicle component such as an electronic control module (ECM), for example and without limitation, is needed.

SUMMARY OF THE INVENTION

This invention is directed to an anti-theft guard that is suitable for protecting components of a vehicle, such as the electronic control module of the diesel engine of a truck, for example and without limitation, from theft.

In one general aspect of the present invention, an anti-theft guard may include a metal cover including a housing and an attachment mechanism. The housing may cover the component that is to be protected. The attachment mechanism may include at least two lateral attaching wings with openings through which bolts may be extended and threaded into respective bolt openings in the block of an engine.

Accordingly, the anti-theft guard is suitable for deterring theft of automobile components such as valuable engine parts of a diesel engine, for example and without limitation.

In one aspect of the present invention, the anti-theft guard may be made of a metallic material, for example and without limitation aluminum, which is sized and configured to substantially cover a component of a vehicle such as the electronic control module (ECM) of a diesel engine, for example and without limitation.

In yet another aspect of the purposed invention, the anti-theft guard may be sized and configured for covering and protecting the electronic control module (ECM) of a diesel engine of a truck.

In still another aspect of this invention, the anti-theft guard which may be installed to a diesel engine of a truck without interfering with its normal operation.

In yet another aspect, the anti-theft guard may include a rectangular opening that facilitates passage of wiring from the ECM to the vehicle engine.

In a further aspect of the present invention, the anti-theft guard may include a simple structure that is easy to manufacture and install.

Some of the advantages of the present invention may be summarized as:

The present invention deters the stealing of valuable piece of equipment in trucks or other vehicles;
the present invention's manufacture is easy and cheap;
the present invention's installation is also easy and cheap;

the present invention does not interfere with the normal operation of the engine;

the present invention is light but strong; and the present invention can be made of rustproof material, for example, aluminum.

In summary, the present invention is generally directed to an anti-theft guard which is suitable for preventing theft of automobile components such as a diesel engine electronic control module (ECM), for example and without limitation, and may include an elongated metallic piece comprising a housing and an attachment mechanism on the housing. In some embodiments, the housing may be generally rectangular and may be sized and configured to cover the electronic control module or other component to be protected. In some embodiments, the attachment mechanism may include multiple laminar wings projecting from the housing.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

DETAILED DESCRIPTION OF REPRESENTATIVE EMBODIMENTS

Figure 1:
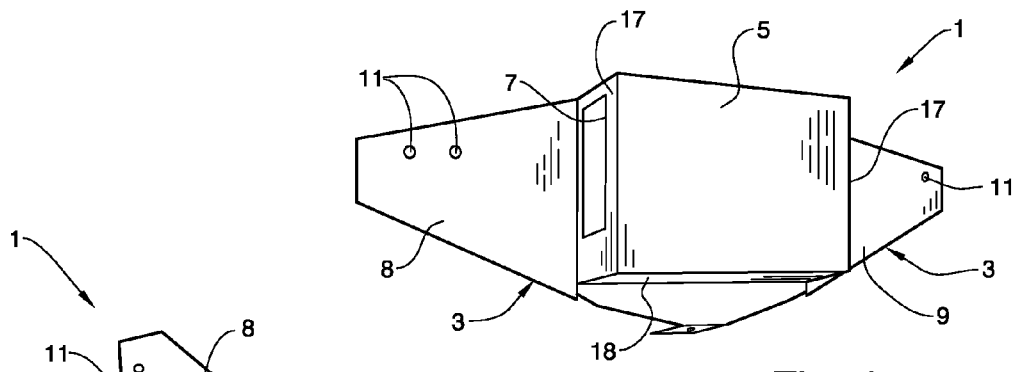
FIG. 1 is a general perspective view of an exemplary embodiment of the anti-theft guard in accordance with the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
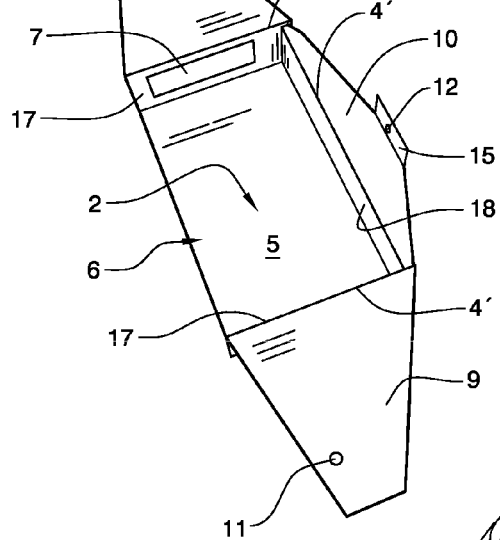
FIG. 2 is a second perspective view of the exemplary embodiment of the anti-theft guard, more particularly illustrating the portion of the guard that faces the engine of a vehicle upon installation of the guard.

Shown throughout the Figures, the invention is directed to an anti-theft guard that is suitable for preventing theft of a component on a vehicle such as a diesel engine electronic control module (ECM), for example and without limitation, on a diesel truck. However, the anti-theft guard may be applicable to preventing theft of any of a variety of components on a vehicle in various applications. The anti-theft guard 1 may include a housing 2 and an attachment mechanism 3 on the housing 2. In some embodiments, the housing 2 may be generally rectangular and may include multiple housing walls 17, 18 and a planar surface or roof 5 supported by the housing walls 17, 18. In some embodiments, the housing 2 may include a pair of generally elongated, parallel, spaced-apart side housing walls 17 and a generally elongated middle housing wall 18 which extends between and is disposed in generally perpendicular relationship with respect to the side housing walls 17. The side housing walls 17, the middle housing wall 18 and the housing panel 5 together may define a housing interior 6 (FIG. 2). A housing opening 7 may be provided in one of the side housing walls 17 to facilitate passage of wiring 28 (FIG. 3) from the housing 2 as will be hereinafter further described. Each of the housing walls 17, 18 may have housing wall edges 4'.

In some embodiments, the attachment mechanism 3 for the housing 2 may include a pair of end housing wings 8 and 9 which extend from the housing wall edges 4' of the respective side housing walls 17. The attachment mechanism 3 may further include a middle housing wing 10 which extends from the housing wall edge 4' of the middle housing wall 18. Collectively, the end housing wings 8 and 9 may define a trapezoid shape. Fastener openings 11 may be provided in each end housing wing 8, 9 to facilitate attachment of the anti-theft guard 1 to an engine block or other structural element (not illustrated) of a vehicle, as will be hereinafter described. The middle housing wing 10 may be generally elongated in shape. A projecting wing ear 15 may extend along an edge of the middle housing wing 10. At least one fastener opening 12 may be provided in the wing ear 15 to receive a bolt 20 for attachment of the anti-theft guard 1 to the engine block 30 or other structural component of the vehicle.

Figure 3:
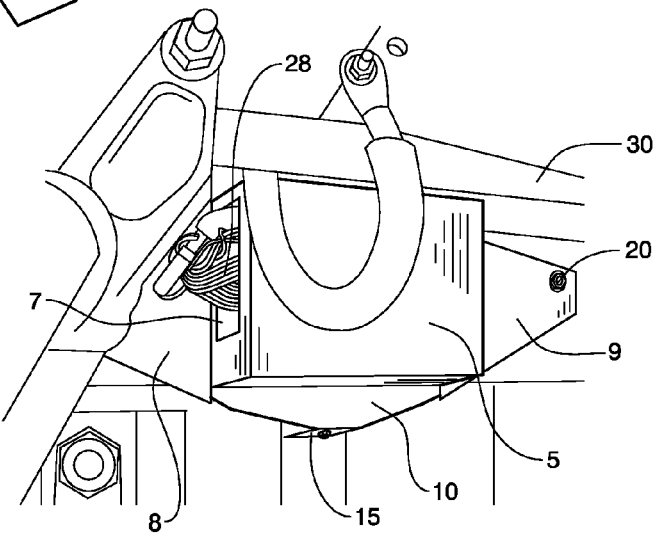
FIG. 3 is a third perspective view of the exemplary embodiment of the anti-theft guard installed on a diesel engine of a truck in exemplary application of the guard.

In some embodiments, the anti-theft guard 1 may include aluminum since an aluminum construction imparts several advantages to the anti-theft guard 1. Specifically, aluminum is rustproof; lightweight; easy to shape; inexpensive; and structurally strong. In other embodiments, any of a variety of materials may be used in fabrication of the anti-theft guard 1. These include stainless steel and special polymers, for example and without limitation As illustrated in FIG. 3, in exemplary application, the anti-theft guard 1 may be fastened to an engine block 30 of a vehicle such as a truck, for example and without limitation, to prevent theft of a component of the vehicle engine. For example and without limitation, in some applications the anti-theft guard 1 may be used to prevent theft of an electronic control module (ECM) of the vehicle engine. Accordingly, the housing 2 may be positioned such that the ECM (not illustrated) is located in the housing interior 6 of the housing 2, which substantially covers or encloses the ECM. Wiring 28 of the ECM may pass through the opening 7 in one of the side housing walls 17. The end housing wings 8, 9 and the middle housing wing 10 may be placed against the engine block 30 and bolts 20 may be extended through the fastener openings 11 in the end housing wings 8, 9 and threaded into registering fastener openings (not illustrated) in the engine block 30. Therefore, once the anti-theft guard 1 is installed in place on the engine block 30, the ECM is completely inaccessible and may be accessed only by removing the bolts 20 from the fastener openings 11 in the end housing wings 8, 9.

It will be appreciated by those skilled in the art that the anti-theft guard 1 is effective in deterring theft of the ECM or other vehicle component that is protected by the anti-theft guard 1. The time which is required for removal of the ECM or other component from the vehicle may be considerably extended since the bolts 20 must first be removed from the fastener openings 11 in the end housing wings 8, 9 and from the fastener opening 12 in the wing ear 15 and the anti-theft guard 1 removed from the engine block 30 before the ECM can be detached and removed from the engine. Therefore, because time is vital to evade detection during theft of a vehicle component, a potential thief is more likely to be deterred to an easier target or caught during attempted theft of the component than would be the case if the anti-theft guard 1 were not in place.

It will be further appreciated by those skilled in the art that the shape and dimensions of the anti-theft guard 1 may differ depending on the particular application. Because every vehicle engine has its own size, configuration and features, the shape and placement of the end housing wings 8, 9 and middle housing wing 10, and the fastener openings 11, 12 for the bolts 20, may require adaptation to the shape and features of the engine to which the anti-theft guard 1 is installed.

Figure 4:
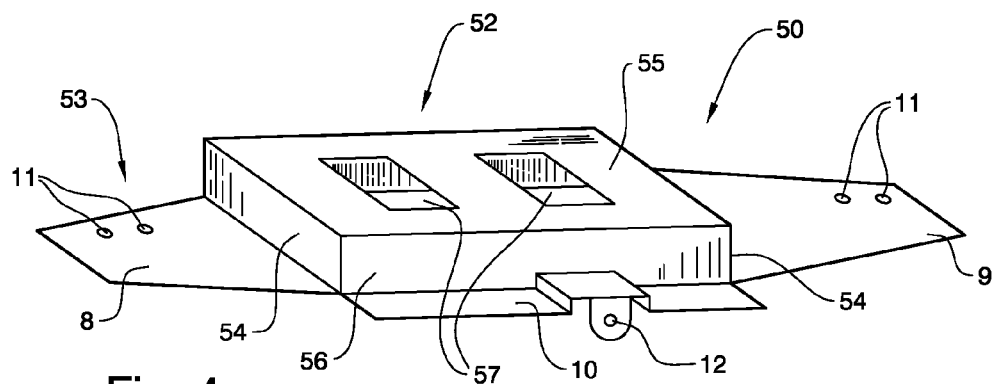
FIG. 4 is a general perspective view of an alternative exemplary embodiment of the anti-theft guard in accordance with the present invention.

FIG. 4 illustrates an alternative illustrative embodiment of an anti-theft guard 50, which is adapted to fit a DETROIT DDEC V and VI ECM diesel engine. The anti-theft guard 50 may include a housing 52 and an attachment mechanism 53 on the housing 52. The housing 52 may include side housing walls 54, a middle housing wall 56 extending between and in generally perpendicular relationship with respect to the side housing walls 54 and a planar housing panel 55 on the side housing walls 54 and the middle housing wall 56. The attachment mechanism 53 may include end housing wings 8, 9 which extend from the respective side housing walls 54 and a middle housing wing 10 which extends from the middle housing wall 56. Fastener openings 11 may be provided in each of the end housing wings 8, 9 and a fastener opening 12 may be provided in the middle housing wing 10 for attachment purposes. In some embodiments, housing openings 57 may be provided in the housing panel 55 to facilitate passage of wiring from the housing 52. Application of the anti-theft guard 50 may be as was heretofore described with respect to the anti-theft guard 1 in FIGS. 1-3.

Figure 5:
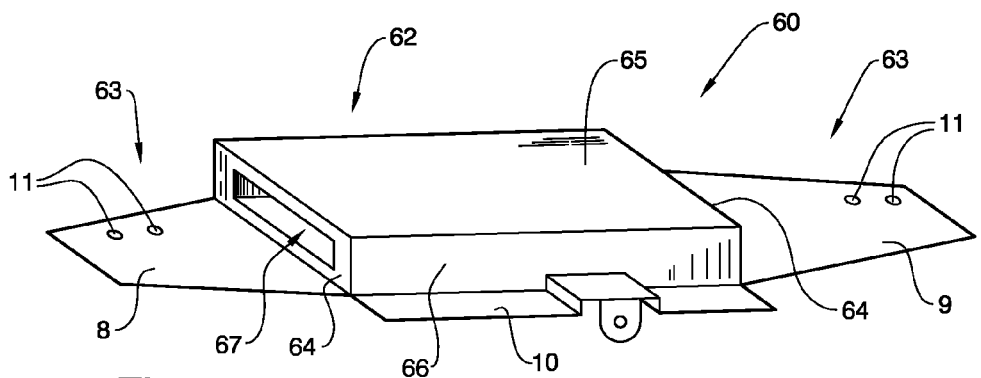
FIG. 5 is a general perspective view of another alternative exemplary embodiment of the anti-theft guard.

FIG. 5 illustrates another alternative illustrative embodiment of an anti-theft guard 60, which is adapted to fit a DETROIT DDEC III and IV diesel engine. The anti-theft guard 60 may include a housing 62 and an attachment mechanism 63 on the housing 62. The housing 62 may include a pair of generally elongated, parallel, spaced-apart side housing walls 64 and a middle housing wall 66 which extends between and is disposed in generally perpendicular relationship with respect to the side housing walls 64. The attachment mechanism 63 may include end housing wings 8, 9 which extend from the respective side housing walls 64 and a middle housing wing 10 which extends from the middle housing wall 66. A planar housing panel 65 may be provided on the side housing walls 64 and the middle housing wall 66. In some embodiments, an opening 67 may be provided in one of the side housing walls 64 to facilitate passage of wiring from the ECM from the housing 62. Application of the anti-theft guard 60 may be as was heretofore described with respect to the anti-theft guard 1 in FIGS. 1-3.

Figure 6:
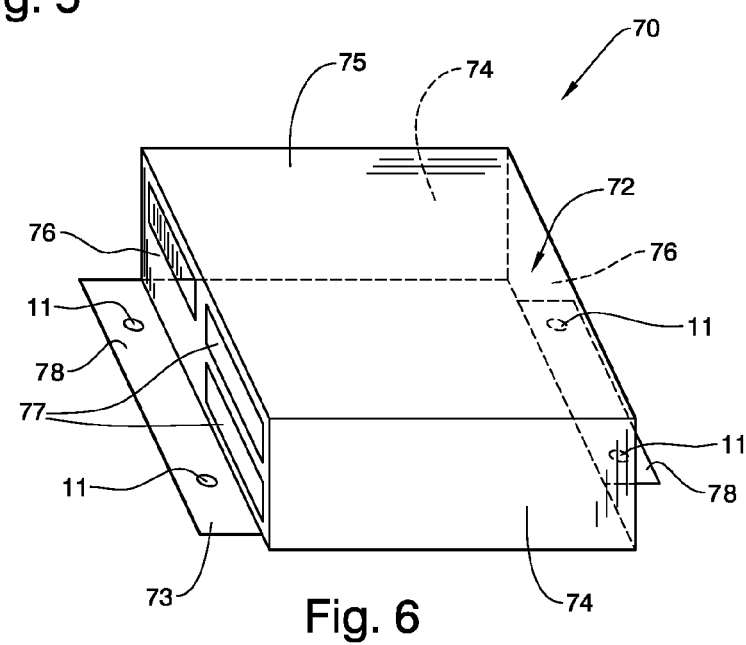
FIG. 6 is a general perspective view of still another alternative exemplary embodiment of the anti-theft guard.

FIG. 6 illustrates still another illustrative embodiment of an anti-theft guard, which is adapted to fit a CUMMINS diesel engine. The anti-theft guard 70 may include a housing 72 and an attachment mechanism 73 on the housing 72. The housing 72 may include a pair of generally elongated, parallel, spaced-apart side housing walls 74 and a pair of generally elongated middle housing walls 76 which extend between the side housing walls 74. A planar housing panel 75 may be provided on the side housing walls 74 and the middle housing walls 76. In some embodiments, at least one opening 77 may extend through at least one of the middle housing walls 76 to facilitate passage of wiring from the ECM from the housing 72. The attachment mechanism 73 may include a pair of middle housing wings 78 which extend from the edges of the respective middle housing walls 76. At least one fastener opening 11 may be provided in each middle housing wing 78 for attachment purposes. Application of the anti-theft guard 70 may be as was heretofore described with respect to the anti-theft guard 1 in FIGS. 1-3.

Figure 7:
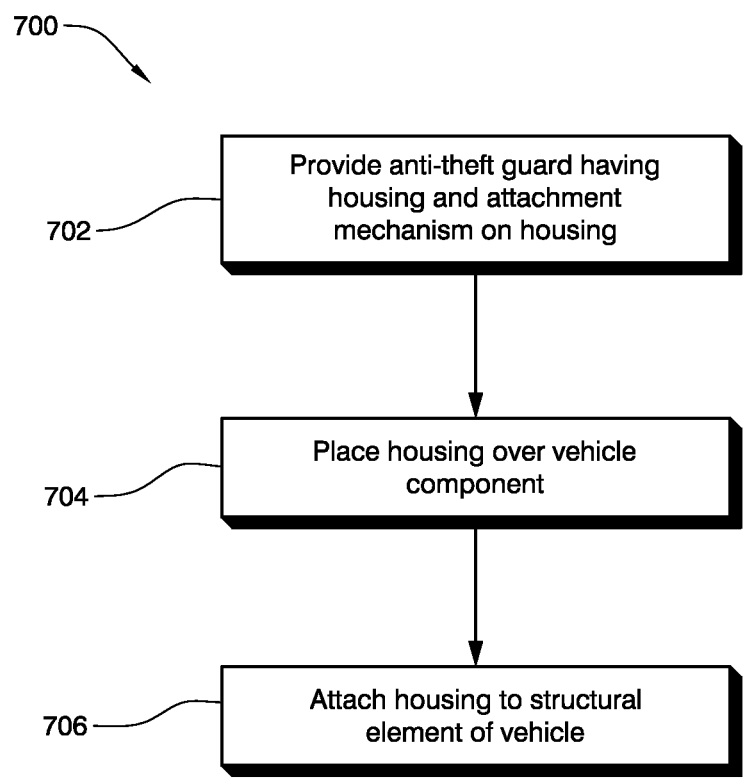
FIG. 7 is a flow diagram of an exemplary embodiment of a method of protecting a component of a vehicle from theft.

Referring next to FIG. 7 of the drawings, a flow diagram of an illustrative embodiment of a method of protecting a component of a vehicle from theft is generally indicated by reference numeral 700. In block 702, an anti-theft guard having a housing and an attachment mechanism on the housing is provided. In some embodiments, the housing may include a pair of generally elongated, parallel, spaced-apart side housing walls and a generally elongated middle housing wall, which extends between and is disposed in generally perpendicular relationship with respect to the side housing walls. In some embodiments, the attachment mechanism may include end housing wings and a middle housing wing that extend from edges of the side housing walls and the middle housing wall, respectively, of the housing.

In block 704, the housing may be placed over the vehicle component, which is to be protected from theft. In some applications, the vehicle component may be an electronic control module (ECM) of a diesel truck engine or other vehicle. In block 706, the housing is attached to a structural element of the vehicle. In some applications, the housing may be attached to an engine block of the engine of a vehicle. In some embodiments, at least one housing opening may be provided in the housing. Wiring from the ECM may be extended through the housing opening or openings.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

I claim:

1. A method of protecting an engine control module of an engine and deterring theft of the engine control module by extending a time period and a physical effort to physically remove the engine control module from an engine block, the method comprising steps of:

obtaining an engine vehicle wherein the engine control module is attached to the engine block of the engine vehicle;

providing an anti-theft guard including:

a housing adapted to substantially enclose the engine control module, the housing comprising a pair of generally elongated, parallel, spaced-apart side housing walls; a generally elongated middle housing wall extending between and in generally perpendicular relationship to the side housing walls; and a generally planar housing panel carried by the side housing walls and the middle housing wall, the panel and housing walls defining a housing cavity having a housing opening, the housing opening defining an open face of the housing and the housing opening adapted to receive the engine control module substantially into the housing cavity; and an attachment mechanism comprising a pair of end housing wings and a middle housing wing carried by the side housing walls and the middle housing wall, respectively, and wherein a proximal edge of each of the housing wings extends along a substantial length of a peripheral wing attachment edge of the respective housing wall;

enclosing the engine control module within the housing cavity by placing the housing opening over the engine control module;

extending the time period and the physical effort to physically remove the engine control module from the engine block by, after the enclosing step, fastening each of the housing wings on the engine block by inserting a fastener device through a fastener opening on each of the housing wings.

2. The method of claim 1, wherein the step of extending the time period and the physical effort to physically remove the engine control module from the engine block further comprises steps of:

forming fastener openings on the engine block, and fastening each of the housing wings on the engine block by threading a bolt through the fastener opening on each of the housing wings and subsequently through a correspondingly formed fastener opening on the engine block.

3. The method of claim 2, wherein said middle housing wing further includes a projecting wing ear extending along a distal edge of the middle housing wing, and the step of fastening each of the housing wings on the engine block by threading the bolt through the fastener opening on each of the housing wings further comprises a step of threading the bolt through a fastener opening on the projecting wing ear.

4. The method of claim 3, wherein the step of extending the time period and the physical effort to physically remove the engine control module from the engine block further comprises a step of extending wiring of the engine control module through a side opening in one of the side housing walls.

5. The method of claim 1, wherein the step of providing the anti-theft guard further comprises a step of fabricating the anti-theft guard of an aluminum material.

6. The method of claim 1, wherein the step of providing the anti-theft guard further comprises a step of fabricating the anti-theft guard of a steel material.

7. The method of claim 1, wherein the step of providing the anti-theft guard further comprises a step of fabricating the anti-theft guard of a polymer material.

8. The method of claim 1, wherein said middle housing wing further includes a projecting wing ear extending along a distal edge of the middle housing wing, and the step of extending the time period and the physical effort to physically remove the engine control module from the engine block further comprises a step of inserting the fastener device through a fastener opening on the projecting wing ear.

9. A method of protecting an engine control module of a diesel engine and deterring theft of the engine control module by extending a time period and a physical effort to physically remove the engine control module from a diesel engine block, the method comprising steps of:

obtaining a diesel engine vehicle wherein the engine control module is attached to the diesel engine block of the diesel engine vehicle;

providing an anti-theft guard including:

a housing adapted to substantially enclose the engine control module, the housing comprising a pair of generally elongated, parallel, spaced-apart side housing walls; a generally elongated middle housing wall extending between and in generally perpendicular relationship to the side housing walls; and a generally planar housing panel carried by the side housing walls and the middle housing wall, the panel and housing walls defining a housing cavity having a housing opening, the housing opening defining an open face of the housing and the housing opening adapted to receive the engine control module substantially into the housing cavity; and an attachment mechanism comprising a pair of end housing wings and a middle housing wing carried by the side housing walls and the middle housing wall, respectively, and wherein a proximal edge of each of the housing wings extends along a substantial length of a peripheral wing attachment edge of the respective housing wall;

enclosing the engine control module within the housing cavity by placing the housing opening over the engine control module;

extending the time period and the physical effort to physically remove the engine control module from the diesel engine block by, after the enclosing step, fastening each of the housing wings on the diesel engine block by inserting a fastener device through a fastener opening on each of the housing wings.

10. The method of claim 9, wherein the step of extending the time period and the physical effort to physically remove the engine control module from the diesel engine block further comprises steps of:

forming fastener openings on the diesel engine block, and fastening each of the housing wings on the diesel engine block by threading a bolt through the fastener opening on each of the housing wings and subsequently through a correspondingly registered fastener opening on the diesel engine block.

11. The method of claim 10, wherein said middle housing wing further includes a projecting wing ear extending along a distal edge of the middle housing wing, and the step of fastening each of the housing wings on the diesel engine block by threading the bolt through the fastener opening on each of the housing wings further comprises a step of threading the bolt through a fastener opening on the projecting wing ear.

12. The method of claim 11, wherein the step of extending the time period and the physical effort to physically remove the engine control module from the diesel engine block further comprises a step of extending wiring of the engine control module through a side opening in one of the side housing walls.

13. The method of claim 9, wherein the step of providing the anti-theft guard further comprises a step of fabricating the anti-theft guard of an aluminum material.

14. The method of claim 9, wherein the step of providing the anti-theft guard further comprises a step of fabricating the anti-theft guard of a steel material.

15. The method of claim 9, wherein the step of providing the anti-theft guard further comprises a step of fabricating the anti-theft guard of a polymer material.

16. The method of claim 9, wherein said middle housing wing further includes a projecting wing ear extending along a distal edge of the middle housing wing, and the step of extending the time period and the physical effort to physically remove the engine control module from the diesel engine block further comprises a step of inserting the fastener device through a fastener opening on the projecting wing ear.

17. An anti-theft guard for an engine control module of an engine comprising:

a housing adapted to substantially enclose the engine control module, the housing comprising a pair of generally elongated, parallel, spaced-apart side housing walls; a generally elongated middle housing wall extending between and in generally perpendicular relationship to the side housing walls; and a generally planar housing panel carried by the side housing walls and the middle housing wall, the panel and housing walls defining a housing cavity having a housing opening, the housing opening defining an open face of the housing and the housing opening adapted to receive the engine control module substantially into the housing cavity;

an attachment mechanism comprising a pair of end housing wings and a middle housing wing carried by the side housing walls and the middle housing wall, respectively, and wherein a proximal edge of each of the housing wings extends along a substantial length of a peripheral wing attachment edge of the respective housing wall; and at least one fastener opening in each of said end housing wings and said middle housing wing.

18. The anti-theft guard of claim 17 wherein a fastening device is inserted through said at least one fastener opening, wherein the fastening device is a bolt.

19. The anti-theft guard of claim 17 wherein said middle housing wing further comprises a projecting wing ear extending along a distal edge of the middle housing wing.

20. The anti-theft guard of claim 17 further comprising a side opening in one of the side housing walls, the side opening adapted to receive a bundle of engine control module wires.

* * * * *